United States Patent [19]

Lagergren

[11] Patent Number: 5,117,678
[45] Date of Patent: Jun. 2, 1992

[54] METHOD FOR STORAGE TANK LEAK DETECTION HAVING GROUND WATER COMPENSATION

[75] Inventor: Peter J. Lagergren, Dallas, Tex.

[73] Assignee: Kaneb Metering Corporation, Dallas, Tex.

[21] Appl. No.: 657,101

[22] Filed: Feb. 19, 1991

Related U.S. Application Data

[63] Continuation of Ser. No. 480,801, Feb. 16, 1990, Pat. No. 4,993,257, which is a continuation-in-part of Ser. No. 312,864, Feb. 21, 1989, Pat. No. 4,914,943.

[51] Int. Cl.$^5$ ............................................. G01M 3/32
[52] U.S. Cl. ................................................... 73/49.2
[58] Field of Search .................. 73/49.2, 299, 302, 298

[56] References Cited

U.S. PATENT DOCUMENTS

| | | | |
|---|---|---|---|
| 4,649,739 | 3/1987 | Horner | 73/49.2 |
| 4,885,931 | 12/1989 | Horner | 73/49.2 |

Primary Examiner—Hezron E. Williams
Assistant Examiner—Joseph W. Roskos
Attorney, Agent, or Firm—Baker & Botts

[57] ABSTRACT

A method is described for enabling leak detection of an underground storage tank surrounded by a water table. The method begins by sealing a test probe in the tank, the test probe having an elongated substantially hollow core with first and second ends, a housing for receiving the second end of the hollow tube and being vented to the fluid product, a low temperature coefficient medium supported in the substantially hollow core of the elongated tube, and a liquid seal supported in the housing between the medium and the fluid product. The method continues by then establishing and maintaining a pressure equilibrium between the hollow core of the test probe and the head space. An inert gas such as nitrogen is then introduced into the head space to overpressurize the head space by an amount sufficient to reestablish a leak at any break in the storage tank despite presence of the water table surrounding the storage tank. Once the tank contents are stabilized, the precision leak test is performed.

8 Claims, 2 Drawing Sheets

METHOD FOR STORAGE TANK LEAK DETECTION HAVING GROUND WATER COMPENSATION

RELATED APPLICATIONS

This is a continuation application of pending prior application Ser. No. 07/480,801, filed on Feb. 16, 1990, by Peter J. Lagergren and entitled "METHOD FOR STORAGE TANK LEAK DETECTION HAVING GROUND WATER COMPENSATION", now U.S. Pat. No. 4,993,257, issued Feb. 19, 1991, which is a continuation-in-part application of Ser. No. 07/312,864; filed Feb. 21, 1989, now U.S. Pat. No. 4,914,943, issued Apr. 10, 1990.

TECHNICAL FIELD

The present invention relates generally to underground storage tank leak detection systems and methods and more particularly to techniques for compensating for the presence of ground water in connection with such leak detection.

BACKGROUND OF THE INVENTION

Underground storage tanks are used to store hazardous substances and petroleum products. It is estimated that a significant proportion of the nearly five million tanks in the United States are leaking harmful products into the environment. To ameliorate this problem, the Environmental Protection Agency (the "EPA") has recently promulgated regulations which require that any leakage exceeding a rate of 0.05 gallons per hour be detected and contained.

Methods for detecting leaks in underground storage tanks are well known in the prior art. Most of these techniques use a quantitative approach to identify a leak or to determine leak rate based on a measurement of volumetric changes of the stored product in the tank. The capability of prior art leak detection methods to accurately measure leakage is affected by certain variables such as temperature change, tank deformation, product evaporation, tank geometry and the characteristics of the stored product. In addition to these variables, the presence of ground water around the tank may completely mask an actual leak or at least slow the rate at which the stored product is leaking.

In particular, the water table of the soil in which the tank is buried can vary in height depending of a number of factors including but not limited to location, time of year and amount of rainfall. If the water table is above the location of a hole or break in the tank, the ground water exerts a pressure on that break which counteracts the pressure exerted by the product in the tank. When the water level is above the product level, the pressure exerted by the ground water is greater than the pressure exerted by the product against the break, and thus the ground water will flow into the tank. If the product level is above the water table level, in some cases the pressure exerted by the product will be exactly balanced by the pressure of the ground water at the break and thus leakage out of the tank will be prevented or greatly reduced. In either case, the true nature and scope of the leak cannot be accurately detected.

One way of compensating for ground water "masking" is to simply postpone the leak test until such time as the ground water is below the bottom of the tank. This approach is, of course, highly impractical and expensive. Another approach is to conduct two consecutive tests, each at a different fluid level in the tank, and compare leak rates. The leak rates will differ if there is a leak due to the differeing head pressures. This approach theoretically is independent of ground water levels because the difference in leak rates should be measurable whether ground water is present or not. In practice, the conducting of two separate leak tests is costly and time-consuming. The technique is also unreliable because the differences in leak rate from changes in head pressure are often obscured by temperature-induced volumetric changes.

Accordingly, there is a need for a reliable and economical method for eliminating ground water "masking" effects in a storage tank leak detection system which overcomes these and other problems associated with prior art techniques.

BRIEF SUMMARY OF THE INVENTION

It is an object of the invention to provide a method for compensating "masking" effects induced by ground water during storage tank leak detection.

It is another object of the present invention to provide a leak detection apparatus that utilizes an isobaric emulated hydrostatic head procedure for accounting for the effects of ground water surrounding an underground storage tank.

It is a further object of the invention to describe precision leak testing methods wherein the effect of ground water is detected and substantially eliminated during the tank testing procedure.

It is still another object of the invention to decrease the time required to perform a precision leak test for an underground storage tank while simultaneously reducing the cost and complexity of such testing.

These and other objects are provided by the novel method and of the present invention wherein a test probe is maintained in pressure equilibrium with a head space of the tank while the space is pressurized by a predetermined amount to establish a pressure disequilibrium between the tank contents and the water table. This procedure provides effective compensation of any ground water masking effects.

The foregoing has outlined some of the more pertinent objects of the present invention. These objects should be construed to be merely illustrative of some of the more prominent features and applications of the invention. Many other beneficial results can be attained by applying the disclosed invention in a different manner of modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
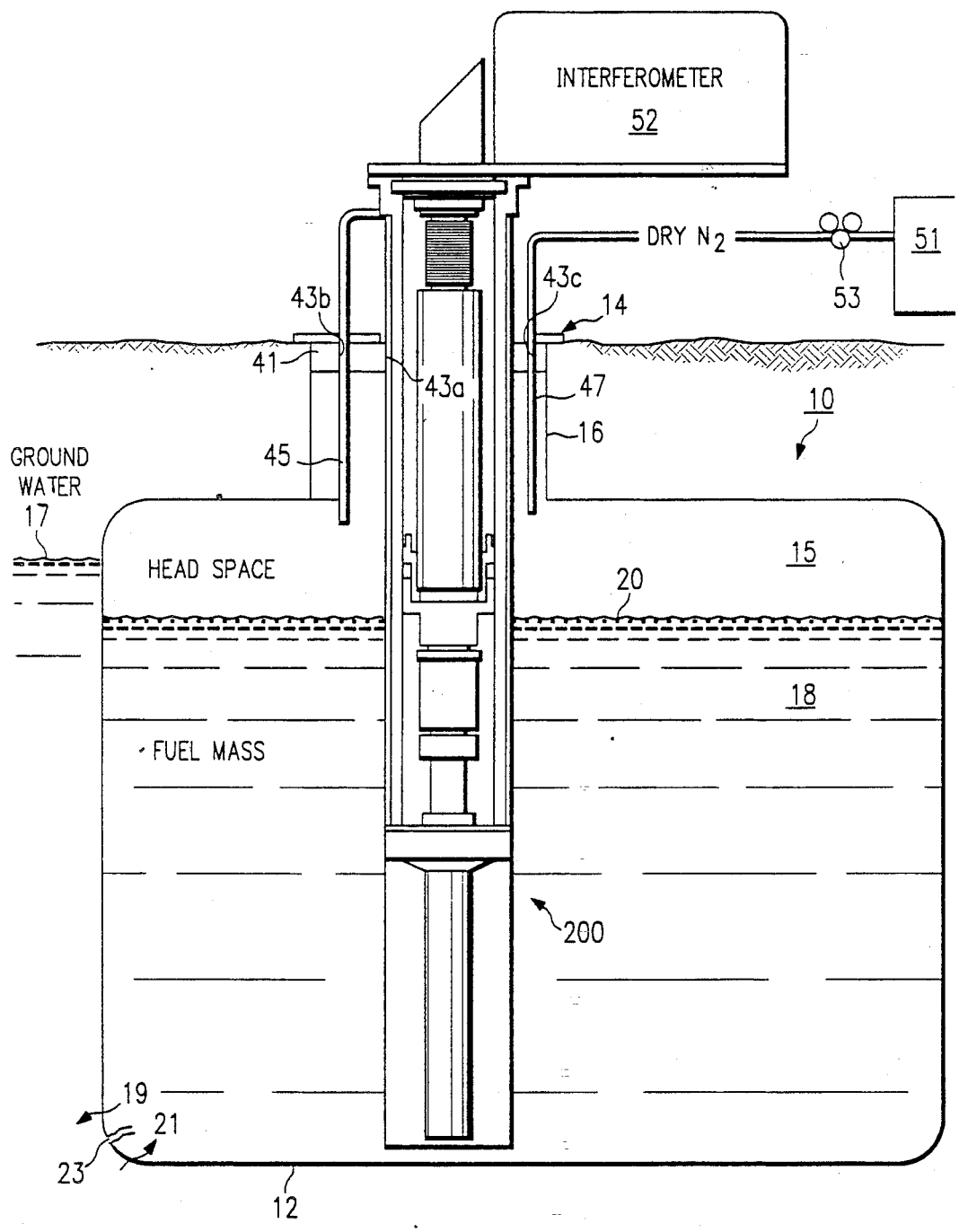
FIG. 1 is a sectional view of an underground storage tank having a fluid product stored therein and surrounded by a high water table, as well as a sectional view of a testing probe for use in providing leak detection in connection therewith.

With reference now to the drawings wherein like reference characters designate like or similar parts through the several views, FIG. 1 is a perspective view of an underground storage tank 10 in which an apparatus for leak detection is used. As used herein, the term "underground" refers to any storage tank with at least some portion of its volume buried below ground. Such tanks are commonly used, for example, to store hazardous substances and hydrocarbon products such as gasoline and crude oil.

The underground storage tank 10 has a base 12 and is mounted with its longitudinal axis horizontal. The tank is generally located several feet below a manhole access port 14. A vertical riser or fill pipe 16 is provided to connect an upper end of the tank 10 to the manhole access port 14, and a standpipe (not shown) is used to fill the tank. In particular, the tank 10 supports a fluid product 18, e.g., hydrocarbon fuel, which has a predetermined volumetric coefficient of expansion per degree Fahrenheit or Centigrade (a "temperature coefficient"). The tank includes a head space 15 above the level of the fluid product 18.

The level or height 20 (and therefore the volume) of the product 18 is affected by product leakage from the tank, designated by arrow 19, or leakage of foreign products into the tank, designated by arrow 21. If a high water table (or perched transient water) surrounds the tank, such water can mask the actual leakage of the product out of the tank and in some cases actually prevent such leakage until the water table drops. Thus accurate and reliable leak testing must account for the existence of high ground water surrounding the storage tank. If the water table 17 is above the location of a hole or break 23 in the tank, the ground water exerts a pressure on that break which counteracts the pressure exerted by the product in the tank. When the water level is above the product level, the pressure exerted by the ground water is greater than the pressure exerted by the product against the break, and thus the ground water will flow into the tank.

Referring back to FIG. 1, a test probe 200 is provided for use in the storage tank leak detection procedure. In the preferred embodiment, this test probe is of the type generally described in copending application Ser. No. 07/312,864, filed Feb. 21, 1989, and more specifically as described in copending application Ser. No. 07/480,809, filed Feb. 16, 1990. Both of these applications are incorporated herein by reference.

Figure 2:
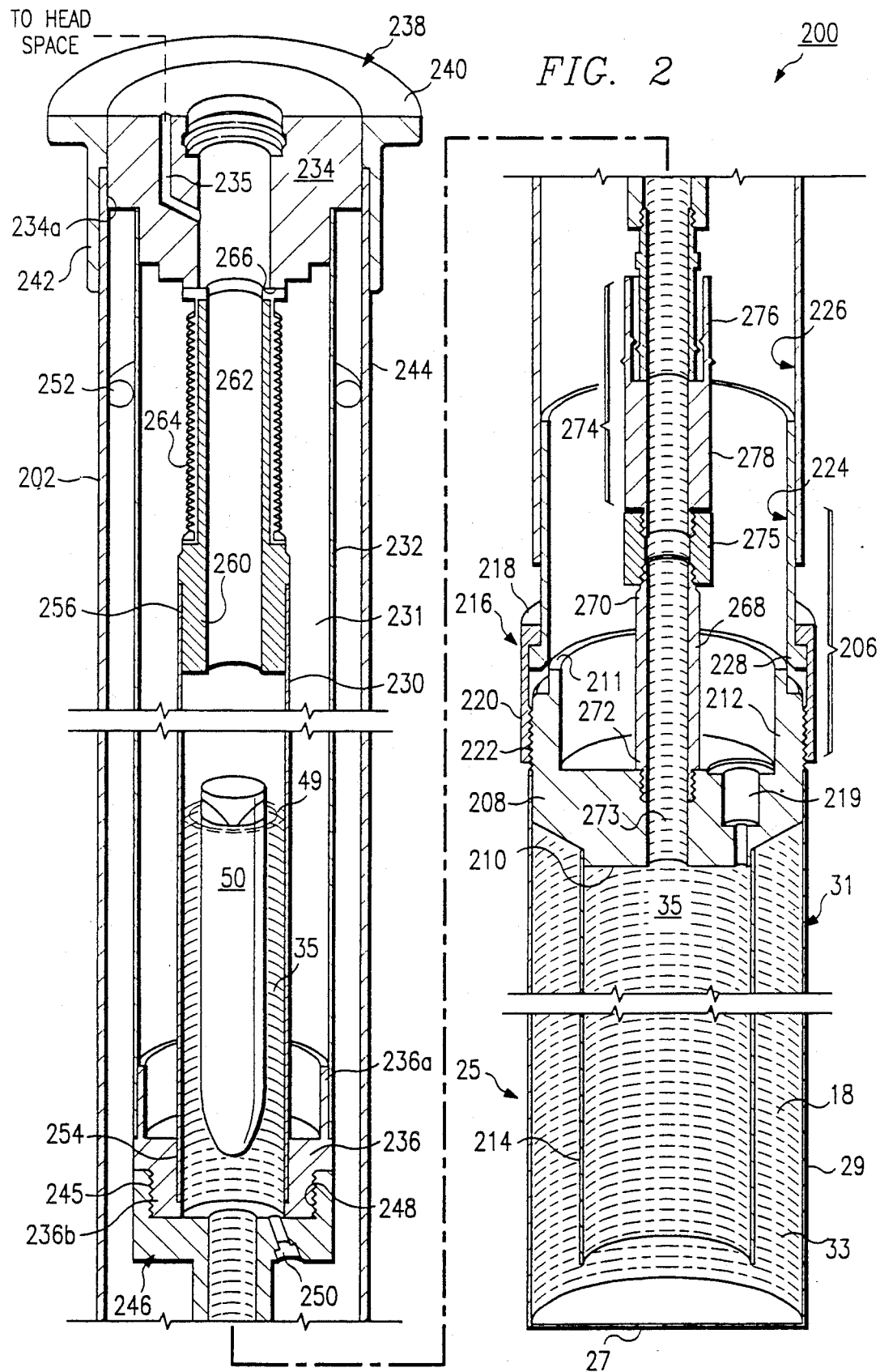
FIG. 2 is a detailed sectional view of the testing probe shown in FIG. 1

Referring briefly to FIG. 2, a detailed view is shown of a preferred embodiment of the test probe 200. The test probe 200 includes a tube 202, preferably formed of a low temperature coefficient material such as graphite or the like, which is removably secured to the housing 25 by a coupling assembly 206. As described earlier, housing 25 includes a base 27 and a circular sidewall 29, and is vented to the hydrocarbon product 18 through opening 31 (or a valve) in the top portion of the housing 25.

Coupling assembly 206 includes a cap 208 having a first end 210, a second end 211 and a threaded sleeve portion 212. The first end 210 of the cap 208 supports a tube 214, with the tube 214 corresponding to the second end 28 of the pressure tube 24 as described with respect to FIG. 5 of U.S. Pat. No. 4,732,035 incorporated herein. Coupling assembly 206 also includes a coupling nut 216 having an annular ring portion 218 and a sleeve 220. Sleeve 220 includes a threaded portion 222 which is adapted to be threaded to the threaded portion 212 of the cap 208. The coupling assembly 206 also includes a flange 224 having a sleeve bonded or otherwise secured to an interior wall 226 of the outer tube 202. The flange 224 includes an annular ring portion 228 adapted to mate with the annular ring portion 218 of the coupling nut 216. Cap 208 also includes an aperture 219 for supporting a temperature sensor (not shown).

The housing 25 supports a non-reactive, liquid barrier seal between the hydrocarbon product 18 and a low temperature coefficient medium supported in the remainder of the test probe 200. The liquid barrier seal 33 comprises a working fluid that is immiscible to both the product 18 and the low temperature coefficient medium. The seal therefore prevents the hydrocarbon product 18 from mixing with the low temperature coefficient medium and vice-versa. In the preferred embodiment, the working fluid 33 is a flourinated silicone and the low temperature coefficient medium 35 is then preferably deionized or distilled water.

Referring simultaneously to FIGS. 1-2, the distilled water or other low temperature coefficient medium 35 supports a float 50 which is used by an interferometer 52 to sense variations in the level of the medium. The float 50 is located within an inner tube 230 which is in turn located within an outer tube 232. The tubes are thus separated by a space 231. Tubes 230 and 232 are preferably formed of stainless steel, aluminum or copper, and are supported within the graphite tube 202 by a pair of tube flanges 234 and 236. In particular, the graphite tube 202 has an opening in its upper end portion adapted to receive the upper tube flange 234. The upper tube flange 234, which includes a vent channel 235, is secured within the opening of the graphite tube 202 by a laser support flange 238 having an annular ring portion 240 and a sleeve 242 bonded or otherwise secured to the outer wall 244 of the graphite tube 202. The lower tube flange 236 has a threaded sleeve portion 245 that is threadably secured to a t-shaped coupling 246 having threads 248. Coupling 246 also includes an opening 250 for supporting a temperature sensor (not shown).

Upper and lower tube flanges 234 and 236 include appropriate radial support surfaces 234a and 236a for supporting the outer tube 232. One or more spacer sleeves 252 can be provided between the outer tube 232 and the inner wall of the graphite tube to stabilize the outer tube. The lower tube flange 236 includes an inner sleeve 236b for receiving a bottom end 254 of the inner tube 230. An upper end 256 of the inner tube 230 is in turn bonded or otherwise secured to a first end 258 of a stabilizer tube 260. Tube 260 has a sleeve 262 about which a bellows 264 is provided. Bellows 264, which allows longitudinal expansion and contraction of the inner tube 230 as will be described, is secured to a facing portion 266 of the upper tube flange 234.

The remainder of the test probe 200 comprises a conduit 268 having upper and lower ends 270 and 272. The lower end 272 is threadably-secured to an aperture 273 centrally-located in the cap 208. The upper end 270 is in turn attached to a quick disconnect assembly 274 by a coupling nut 275. The quick disconnect assembly is conventional and includes upper and lower sections 276 and 278. Therefore, the housing 25 and tube 214 are separable from the remainder of the probe 200 by unscrewing the coupling nut 216 and separating the first and second sections 276 and 278 of the quick disconnect assembly 274.

A column of the low temperature coefficient medium 35 is therefore supported (above the barrier 33) in the tube 214, the conduit 268, the coupling nut 275, the quick disconnect assembly 274, the coupling 246, the lower tube flange 236 and the inner tube 230.

The tube 200 is formed of graphite or some other similar low temperature coefficient of expansion material. The graphite tube insures that longitudinal temperature variations in the fluid product along the length of the tube 202 are not transmitted to the medium 35 that is supported in the inner tube 230. Additional isolation of the medium 35 from such temperature variations is further provided according to the invention by thermally isolating the tube 202 from the inner tube 230 in which the low temperature coefficient material is supported. In the preferred embodiment, this thermal isolation is provided by outer tube 232 and by evacuating the space 231 located between the inner and outer tubes 230 and 232. This vacuum is preferably created during manufacture of the test probe. Alternatively, a low temperature coefficient fluid can be introduced into the space 231 by a pump 233 vented through the upper tube flange. The pump circulates the fluid to maintain such additional thermal isolation. As also described above, the bellows 264 is further provided surrounding an upper portion of the inner tube for allowing longitudinal expansion and contraction of the inner tube 230. Thus even if the thermal isolation provided by the outer tube and the evacuated space 231 (or circulating fluid) does not completely eliminate all temperature variations along the inner tube length, the bellows 264 provides additional compensation if needed.

Referring back to FIG. 1, the method of the present invention can now be described in detail. According to the method, a pressure seal 41 is first supported adjacent the top portion of the fill pipe 16. Preferably the pressure seal is made of rubber or the like; alternatively, the seal is an inflatable cuff. The pressure seal includes a first aperture 43a for receiving the probe 200, a second aperture 43b for receiving a probe vent line 45, and a third aperture 43c for receiving a gas line 47 for the purposes to be described. After placement of the pressure seal (and/or inflation of the inflatable cuff), all other tank vent and/or manifold lines including the standpipe are sealed.

The test probe is then vented to the head space 15 by connecting the probe vent line 45 through the second aperture 43b to the interior of the tank. The connection of the probe vent line 45 to the head space insures that the low temperature coefficient medium 35 supported in the inner tube 230 of the probe is at the same pressure as the head space 15. Of course, the probe can be vented to the head space prior to sealing off the remainder of the tank vent lines by connecting the probe vent line 45 prior to inflating the inflatable cuff. Once sealing has been effected, the probe and the head space remain in isobaric (i.e., atmospheric) pressure equilibrium. If desired, the test probe and the pressure seal can be placed into the fill pipe at the same time.

To provide effective ground water compensation, the method of the present invention includes the step of then pressurizing the head space 15 through the introduction of a pressurized gas through line 47. Preferably, an inert gas, such as nitrogen, is supplied from gas source 51 via regulator 53 through the gas line 47 and into the head space 15 for this purpose. The gas could also be helium, oxygen, hydrogen or other inert gas that does not mix with the product stored in the tank. Thus, according to the method, the test probe is maintained in a pressure equilibrium with the head space while the head space is essentially overpressurized. This operation creates a pressure disequilibrium between the tank contents and the surrounding water table, thus reestablishing the outflow of the product at the break in the tank. Once the tank contents stabilize and the leak is reestablished, accurate leak detection is effected using the test probe.

According to the method of the present invention, the test probe is maintained in pressure equilibrium with the head space of the tank while the space is pressurized by a predetermined amount. In the preferred embodiment, dry nitrogen is introduced into the head space with the low pressure regulator and allowed to stabilize at a pressure sufficient to produce a hydrostatic head required to reintroduce a nominal 0.1 gallon per hour (gph) leak. The degree of hydrostatic pressure applied is preferably calculated by the following formula:

Overpressure = [(Fluid Height @95%)/232 in3] * Density.

where the Fluid Height is the height in inches of the medium in the inner tube 230 and Density is the density of the product 18 measured in pounds per gallon. Thus, for a tank with 6 pounds per gallon density fuel and a 95% full column height of 85 inches, the formula returns a maximum tank bottom head pressure of 2.2 pounds per square inch. Consequently, the tank head space would be overpressurized to 2.2 psi with nitrogen, which overpressure would then also be seen by the inner tube of the probe. After the tank is stabilized to accomodate the instantaneous tank end wall deflection induced by the overpressure, the precision leak test is carried out. Since overpressurizing the head space establishes a pressure disequilibrium between the tank contents and the water table, the leak becomes active (and thus detectable) despite the presence of ground water surrounding the tank.

The method of the present invention is also applicable in volumetric tank testing methods. One such method involves overfilling the tank into the delivery fill pipe which serves to magnify the volume/height changes of a fluid leak. Thermal compensation is performed by vertical sampling of the temperature of the product in the tank and correcting the measured height change for thermal expansion or contraction of the fluid. By pressurizing the delivery fill pipe and the height measuring apparatus as described by the teachings of this invention, a leak may be reestablished in the presence of ground water around the tank.

In another volumetric method, a reservoir and pump arrangement is used to maintain constant hydrostatic pressure in the fill pipe by adding or withdrawing fluid to maintain a constant level. The net temperature-corrected volume of added or subtracted fluid is then converted into a net leak/ingress rate. By pressurizing the fill pipe and reservoir assembly according to the teachings of the present invention, the method may be used when the tank breach is surrounded by ground water.

It should be appreciated by those skilled in the art that the specific embodiments disclosed above may be readily utilized as a basis for modifying or designed other structures for carrying out the same purposes of the present invention. It should also be realized by those skilled in the art that such equivalent constructions do not depart from the spirit and scope of the invention as set forth in the appended claims.

What is claimed is:

1. A method for leak detection of a storage tank surrounded by fluid, the tank for supporting a fluid product and including a head space between the fluid product and a top portion thereof, comprising the steps of:

sealing a test probe in the tank, the test probe having an elongated substantially hollow core with first and second ends, a housing for receiving the second end of the hollow core and being vented to the fluid product, a medium supported in the substantially hollow core, and a liquid seal supported in the housing between the medium and the fluid product;

maintaining the hollow core of the test probe and the head space in pressure equilibrium; and introducing a gas into the head space to overpressurize the head space by an amount sufficient to reestablish a leak at any break in the storage tank despite presence of the fluid surrounding the storage tank.

2. The method as described in claim 1, further including the steps of:

allowing the fluid product in the tank to stabilize; and performing a precision leak test using the test probe.

3. The method as described in claim 1 further including the step of sealing any tank vent lines prior to introducing the gas into the head space.

4. The method as described in claim 1 wherein the gas is nitrogen which is introduced into the head space via a low pressure regulator.

5. The method as described in claim 1 wherein the gas is inert.

6. The method of claim 1 wherein the medium within the test probe comprises a low temperature coefficient type.

7. A method for leak detection of a storage tank surrounded by fluid, the tank for supporting a fluid product and including a head space between the fluid product and a top portion thereof, comprising the steps of:

sealing a test probe in the tank; and overpressurizing the head space by an amount sufficient to reestablish a leak at any break in the storage tank despite presence of the fluid surrounding the storage tank.

8. The method of claim 7 wherein said overpressurizing step comprises the step of introducing a gas into the head space.

* * * * *